US011823440B2

United States Patent
Brown et al.

(10) Patent No.: US 11,823,440 B2
(45) Date of Patent: Nov. 21, 2023

(54) IMAGING SYSTEM WITH UNSUPERVISED LEARNING

(71) Applicant: Rehrig Pacific Company, Los Angeles, CA (US)

(72) Inventors: Justin Michael Brown, Coppell, TX (US); Daniel James Thyer, Charlotte, NC (US)

(73) Assignee: Rehrig Pacific Company, Los Angeles, CA (US)

( * ) Notice: Subject to any disclaimer, the term of this patent is extended or adjusted under 35 U.S.C. 154(b) by 0 days.

(21) Appl. No.: 17/891,969

(22) Filed: Aug. 19, 2022

(65) Prior Publication Data

US 2023/0054508 A1    Feb. 23, 2023

Related U.S. Application Data

(60) Provisional application No. 63/235,102, filed on Aug. 19, 2021.

(51) Int. Cl.
*G06T 7/00* (2017.01)
*G06V 10/774* (2022.01)

(52) U.S. Cl.
CPC .................. *G06V 10/774* (2022.01)

(58) Field of Classification Search
CPC ...... G06V 20/52; G06V 10/10; G06V 10/242; G06V 20/58; G06V 20/647; G06V 30/224; G06V 10/44; G06V 20/68; G06V 40/172; G06V 10/751; G06V 20/50; G06V 2201/06; G06V 10/40; G06V 10/22; G06V 10/757; G06V 10/759; G06V 20/80; G06V 20/49; G06Q 10/087; G06Q 30/0641; G06Q 30/0601; G06Q 10/02; G06Q 30/0639; G06Q 50/28; G06T 7/0004; G06T 7/74; G06T 2207/20212; G06T 2207/30108
See application file for complete search history.

(56) References Cited

U.S. PATENT DOCUMENTS

| 5,730,252 A | 3/1998 | Herbinet |
| 6,026,378 A | 2/2000 | Onozaki |

(Continued)

FOREIGN PATENT DOCUMENTS

| AU | 2021212010 A1 | 2/2022 |
| CN | 109906486 A | 6/2019 |

(Continued)

OTHER PUBLICATIONS

International Search Report for International Application No. PCT/US22/40947 dated Dec. 12, 2022.

*Primary Examiner* — Quan M Hua
(74) *Attorney, Agent, or Firm* — Carlson, Gaskey & Olds, P.C.

(57) ABSTRACT

An imaging system and method uses grouping and elimination to label images of unknown items. The items may be stacked together with known or unknown items. The items may be packages, such as packages of beverage containers. A machine learning model may be used to infer skus of the packages. The machine learning model is trained on known skus but is not trained on unknown skus. Multiple images of the same unknown sku are grouped using the machine learning model. Elimination based upon lists of expected skus is used to label each group of unknown skus.

24 Claims, 3 Drawing Sheets

(56) References Cited

U.S. PATENT DOCUMENTS

| | | |
|---|---|---|
| 6,626,634 B2 | 9/2003 | Hwang et al. |
| 6,721,762 B1 | 4/2004 | Levine et al. |
| 6,918,229 B2 | 7/2005 | Lancaster, III et al. |
| 7,097,045 B2 | 8/2006 | Winkler |
| 7,480,640 B1 | 1/2009 | Elad et al. |
| 7,548,166 B2 | 7/2009 | Roeder et al. |
| 7,557,714 B2 | 7/2009 | Roeder et al. |
| 7,602,288 B2 | 10/2009 | Broussard |
| 7,679,504 B2 | 3/2010 | Wang et al. |
| 7,698,179 B2 | 4/2010 | Leung et al. |
| 7,739,147 B2 | 6/2010 | Branigan et al. |
| 7,765,668 B2 | 8/2010 | Townsend et al. |
| 7,865,398 B2 | 1/2011 | Schon |
| 7,877,164 B2 | 1/2011 | Grunbach et al. |
| 7,882,366 B2 | 2/2011 | Sen et al. |
| 8,494,673 B2 | 7/2013 | Miranda et al. |
| 8,718,372 B2 | 5/2014 | Holeva et al. |
| 8,739,502 B2 | 6/2014 | Lancaster, III |
| 8,839,132 B2 | 9/2014 | Reichert |
| 8,849,007 B2 | 9/2014 | Toleva et al. |
| 8,885,948 B2 | 11/2014 | Holeva et al. |
| 8,892,241 B2 | 11/2014 | Weiss |
| 8,908,995 B2 | 12/2014 | Benos et al. |
| 8,918,976 B2 | 12/2014 | Townsend et al. |
| 8,934,672 B2 | 1/2015 | Holeva et al. |
| 8,938,126 B2 | 1/2015 | Holeva et al. |
| 8,965,559 B2 | 2/2015 | Pankratov et al. |
| 8,977,032 B2 | 3/2015 | Holeva et al. |
| 8,978,984 B2 | 3/2015 | Hennick et al. |
| 8,995,743 B2 | 3/2015 | Holeva et al. |
| 9,025,827 B2 | 5/2015 | Holeva et al. |
| 9,025,886 B2 | 5/2015 | Holeva et al. |
| 9,082,195 B2 | 7/2015 | Holeva et al. |
| 9,087,384 B2 | 7/2015 | Holeva et al. |
| 9,171,278 B1 | 10/2015 | Kong et al. |
| 9,224,120 B2 | 12/2015 | Grabiner et al. |
| 9,373,098 B2 | 6/2016 | Nashif et al. |
| 9,488,466 B2 | 11/2016 | Hanson |
| 9,488,986 B1 | 11/2016 | Solanki |
| 9,489,655 B1 | 11/2016 | Lecky |
| 9,503,704 B2 | 11/2016 | Ando |
| 9,505,554 B1 | 11/2016 | Kong et al. |
| 9,725,195 B2 | 8/2017 | Lancaster, III et al. |
| 9,727,840 B2 | 8/2017 | Bernhardt |
| 9,734,367 B1 | 8/2017 | Lecky et al. |
| 9,811,632 B2 | 11/2017 | Grabiner et al. |
| 9,821,344 B2 | 11/2017 | Zsigmond et al. |
| 9,826,213 B1 | 11/2017 | Russell et al. |
| 9,830,485 B1 | 11/2017 | Lecky |
| 9,944,417 B2 | 4/2018 | Lemieux et al. |
| 9,969,572 B2 | 5/2018 | Pankratov et al. |
| 9,984,339 B2 | 5/2018 | Hance et al. |
| 9,990,535 B2 | 6/2018 | Phillips et al. |
| 10,005,581 B2 | 6/2018 | Lancaster, III et al. |
| 10,026,044 B1 | 7/2018 | Wurman et al. |
| 10,042,079 B2 | 8/2018 | Patnaik |
| 10,055,805 B2 | 8/2018 | Satou |
| 10,071,856 B2 | 9/2018 | Hance et al. |
| 10,089,509 B2 | 10/2018 | Nachtrieb |
| 10,133,990 B2 | 11/2018 | Hance et al. |
| 10,134,120 B2 | 11/2018 | Jovanovski et al. |
| 10,140,724 B2 | 11/2018 | Benos et al. |
| 10,155,199 B2 | 12/2018 | Sakai et al. |
| 10,198,805 B2 | 2/2019 | Halata |
| 10,217,075 B1 | 2/2019 | Ward et al. |
| 10,220,970 B2 | 3/2019 | Lemieux et al. |
| 10,227,152 B2 | 3/2019 | Lancaster, III et al. |
| 10,229,487 B2 | 3/2019 | Goyal et al. |
| 10,265,871 B2 | 4/2019 | Hance et al. |
| 10,266,349 B2 | 4/2019 | Pankratov et al. |
| 10,328,578 B2 | 6/2019 | Holz |
| 10,346,987 B1 | 7/2019 | Landman |
| 10,347,095 B2 | 7/2019 | Mattingly et al. |
| 10,363,664 B2 | 8/2019 | Yoshii |
| 10,369,701 B1 * | 8/2019 | Diankov .................. G06T 7/50 |
| 10,402,956 B2 | 9/2019 | Jovanovski et al. |
| 10,430,969 B2 | 10/2019 | Kopelke et al. |
| 10,442,640 B2 | 10/2019 | Pankratov et al. |
| 10,456,915 B1 | 10/2019 | Diankov |
| 10,482,401 B2 | 11/2019 | Wurman et al. |
| 10,491,881 B1 | 11/2019 | Russell et al. |
| 10,504,343 B2 | 12/2019 | Mattingly et al. |
| 10,518,973 B2 | 12/2019 | Hance et al. |
| 10,562,188 B1 | 2/2020 | Diankov et al. |
| 10,562,189 B1 | 2/2020 | Diankov et al. |
| 10,569,416 B1 | 2/2020 | Diankov |
| 10,569,417 B1 | 2/2020 | Diankov |
| 10,576,631 B1 | 3/2020 | Diankov |
| 10,592,842 B2 | 3/2020 | High et al. |
| 10,596,701 B1 | 3/2020 | Diankov |
| 10,607,182 B2 | 3/2020 | Shah et al. |
| 10,614,319 B2 | 4/2020 | Douglas et al. |
| 10,616,553 B1 | 4/2020 | Russell et al. |
| 10,618,172 B1 | 4/2020 | Diankov et al. |
| 10,621,457 B2 | 4/2020 | Schimmel |
| 10,627,244 B1 | 4/2020 | Lauka et al. |
| 10,628,763 B2 | 4/2020 | Hance et al. |
| 10,643,038 B1 | 5/2020 | McCalib, Jr. et al. |
| 10,643,170 B2 | 5/2020 | Lee et al. |
| 10,655,945 B2 | 5/2020 | Nanda et al. |
| 10,679,379 B1 | 6/2020 | Diankov et al. |
| 10,685,197 B2 | 6/2020 | Plummer et al. |
| 10,703,584 B2 | 7/2020 | Diankov et al. |
| 10,703,585 B2 | 7/2020 | Pankratov et al. |
| 10,706,571 B2 | 7/2020 | Sugimura et al. |
| 10,724,973 B2 | 7/2020 | Paresi |
| 10,759,599 B2 | 9/2020 | Hance et al. |
| 10,769,806 B2 | 9/2020 | Driegen et al. |
| 10,796,423 B2 | 10/2020 | Goja |
| 10,845,184 B2 | 11/2020 | Benos et al. |
| 10,845,499 B2 | 11/2020 | Paresi |
| 10,867,275 B1 | 12/2020 | Dholakia et al. |
| 11,275,815 B2 | 3/2022 | Siani Cohen et al. |
| 11,308,616 B2 | 4/2022 | Ceballos Lentini et al. |
| 11,383,930 B2 | 7/2022 | Martin, Jr. et al. |
| 2004/0069850 A1 | 4/2004 | De Wilde |
| 2004/0220694 A1 | 11/2004 | Stingel, III et al. |
| 2005/0071234 A1 | 3/2005 | Schon |
| 2005/0246056 A1 | 11/2005 | Marks et al. |
| 2006/0187041 A1 | 8/2006 | Olsen, III et al. |
| 2006/0242820 A1 | 11/2006 | Townsend et al. |
| 2006/0255949 A1 | 11/2006 | Roeder et al. |
| 2006/0255950 A1 | 11/2006 | Roeder et al. |
| 2007/0126578 A1 | 6/2007 | Broussard |
| 2007/0156281 A1 | 7/2007 | Leung et al. |
| 2007/0163099 A1 | 7/2007 | Townsend et al. |
| 2010/0202702 A1 | 8/2010 | Benos et al. |
| 2011/0118130 A1 | 5/2011 | Loring et al. |
| 2012/0057022 A1 | 3/2012 | Nechiporenko et al. |
| 2012/0175412 A1 | 7/2012 | Grabiner et al. |
| 2013/0101166 A1 | 4/2013 | Holeva et al. |
| 2013/0101167 A1 | 4/2013 | Holeva et al. |
| 2013/0101173 A1 | 4/2013 | Holeva et al. |
| 2013/0101201 A1 | 4/2013 | Holeva et al. |
| 2013/0101202 A1 | 4/2013 | Holeva et al. |
| 2013/0101203 A1 | 4/2013 | Holeva et al. |
| 2013/0101204 A1 | 4/2013 | Holeva et al. |
| 2013/0101227 A1 | 4/2013 | Holeva et al. |
| 2013/0101228 A1 | 4/2013 | Holeva et al. |
| 2013/0101229 A1 | 4/2013 | Holeva et al. |
| 2013/0101230 A1 | 4/2013 | Holeva et al. |
| 2013/0282165 A1 | 10/2013 | Pankratov et al. |
| 2015/0101281 A1 | 4/2015 | Kudia |
| 2015/0102100 A1 | 4/2015 | Hattrup et al. |
| 2015/0149946 A1 | 5/2015 | Benos et al. |
| 2015/0166272 A1 | 6/2015 | Pankratov et al. |
| 2015/0325013 A1 | 11/2015 | Patnaik |
| 2016/0104274 A1 | 4/2016 | Jovanovski et al. |
| 2016/0104290 A1 | 4/2016 | Patnaik |
| 2016/0110630 A1 | 4/2016 | Heusch et al. |
| 2016/0154939 A1 | 6/2016 | Grabiner et al. |
| 2016/0275441 A1 | 9/2016 | Barber et al. |
| 2016/0371512 A1 | 12/2016 | Hattrup et al. |
| 2017/0076469 A1 | 3/2017 | Sonoura et al. |

(56) References Cited

U.S. PATENT DOCUMENTS

| | | |
|---|---|---|
| 2017/0132773 A1 | 5/2017 | Toedtli |
| 2017/0154397 A1 | 6/2017 | Satou |
| 2017/0161673 A1 | 6/2017 | High et al. |
| 2017/0193432 A1 | 7/2017 | Bernhardt |
| 2017/0286907 A1* | 10/2017 | Rizkallah .......... G06Q 10/0875 |
| 2017/0316253 A1 | 11/2017 | Phillips et al. |
| 2018/0025185 A1 | 1/2018 | Hattrup et al. |
| 2018/0029797 A1 | 2/2018 | Hance et al. |
| 2018/0043547 A1 | 2/2018 | Tance et al. |
| 2018/0057284 A1* | 3/2018 | Carpenter .............. B65G 57/22 |
| 2018/0060630 A1 | 3/2018 | Nachtrieb |
| 2018/0060764 A1 | 3/2018 | Hance et al. |
| 2018/0089517 A1 | 3/2018 | Douglas et al. |
| 2018/0218247 A1 | 8/2018 | Lee et al. |
| 2018/0224569 A1 | 8/2018 | Paresi |
| 2018/0225597 A1 | 8/2018 | Hance et al. |
| 2018/0247404 A1 | 8/2018 | Goyal et al. |
| 2018/0253857 A1 | 9/2018 | Driegen et al. |
| 2018/0257879 A1 | 9/2018 | Pankratov et al. |
| 2018/0260772 A1* | 9/2018 | Chaubard ............. G06T 7/0008 |
| 2018/0273226 A1 | 9/2018 | Lancaster, III et al. |
| 2018/0304468 A1 | 10/2018 | Holz |
| 2018/0314866 A1 | 11/2018 | Kotula |
| 2018/0314867 A1 | 11/2018 | Kotula |
| 2018/0322424 A1 | 11/2018 | Wurman et al. |
| 2018/0370046 A1 | 12/2018 | Hance et al. |
| 2018/0370727 A1 | 12/2018 | Hance et al. |
| 2019/0005668 A1 | 1/2019 | Sugimura et al. |
| 2019/0026878 A1 | 1/2019 | Jovanovski et al. |
| 2019/0034839 A1 | 1/2019 | Hance et al. |
| 2019/0041341 A1 | 2/2019 | Paresi |
| 2019/0049234 A1 | 2/2019 | Benos et al. |
| 2019/0102874 A1 | 4/2019 | Goja |
| 2019/0122173 A1 | 4/2019 | Souder et al. |
| 2019/0156086 A1 | 5/2019 | Plummer et al. |
| 2019/0206059 A1 | 7/2019 | Landman |
| 2019/0220990 A1 | 7/2019 | Goja et al. |
| 2019/0248604 A1 | 8/2019 | Pankratov et al. |
| 2019/0251385 A1 | 8/2019 | Kotula |
| 2019/0295385 A1 | 9/2019 | Mattingly et al. |
| 2020/0039765 A1 | 2/2020 | Pankratov et al. |
| 2020/0087068 A1 | 3/2020 | Tance et al. |
| 2020/0104785 A1 | 4/2020 | Ehrman et al. |
| 2020/0105008 A1 | 4/2020 | Ehrman et al. |
| 2020/0130961 A1 | 4/2020 | Diankov et al. |
| 2020/0130962 A1 | 4/2020 | Yu et al. |
| 2020/0134828 A1 | 4/2020 | Diankov et al. |
| 2020/0134830 A1 | 4/2020 | Yu et al. |
| 2020/0238517 A1 | 7/2020 | Diankov |
| 2020/0238519 A1 | 7/2020 | Diankov et al. |
| 2020/0265494 A1 | 8/2020 | Glaser et al. |
| 2020/0273131 A1* | 8/2020 | Martin, Jr. ......... G06K 7/10237 |
| 2020/0294244 A1 | 9/2020 | Diankov et al. |
| 2020/0302243 A1 | 9/2020 | Fryshman |
| 2020/0311362 A1 | 10/2020 | Plummer et al. |
| 2020/0334856 A1 | 10/2020 | Staudinger et al. |
| 2020/0356798 A1 | 11/2020 | Kotula |
| 2021/0287109 A1 | 9/2021 | Cmielowski et al. |
| 2021/0342708 A1 | 11/2021 | Klug et al. |
| 2021/0342857 A1 | 11/2021 | Tzur et al. |
| 2021/0357429 A1 | 11/2021 | Watson et al. |
| 2022/0100935 A1 | 3/2022 | Chen |
| 2022/0121866 A1 | 4/2022 | Balch et al. |

FOREIGN PATENT DOCUMENTS

| | | |
|---|---|---|
| CN | 107944454 B | 9/2021 |
| CN | 113377850 B | 4/2022 |
| KR | 20100051156 A | 12/2012 |
| RU | 2708504 C1 | 12/2019 |
| TW | I755918 B | 2/2022 |
| WO | 2010123458 A1 | 10/2010 |

* cited by examiner

IMAGING SYSTEM WITH UNSUPERVISED LEARNING

BACKGROUND

The assignee of the present application has developed a validation system which images a stack of items, such as a stack of products on a pallet. The images are analyzed by the system using machine learning models to identify the skus of the items on the pallet. The identified skus are then compared to the skus on the picklist corresponding to the pallet. A user is notified of any errors, and the system may aid in correcting any such errors.

In one implementation, the skus are containers of beverage containers. Each sku has an associated package type and an associated brand. The possible package types include cartons of cans of a beverage, plastic beverage crates containing bottles or cans, cardboard boxes containing bottles, cardboard trays with a plastic overwrap containing plastic bottles. Additionally, there are different size bottles, different size cans, etc. The "brand" indicates the particular beverage contained therein (e.g. flavor, diet/regular, caffeine/no caffeine, etc). There are many different kinds of beverages that can be inside the many different beverage containers, although some beverages are only provided in a subset of the beverage containers. There are many different permutations of flavors, sizes, and types of beverage containers in each warehouse or distribution center.

Additionally, even for a given brand and a given package type, the exterior appearance of the package may vary. For example, often a beverage producer will change the exterior appearance of cartons of cans, such as for a holiday season, sponsored sporting event, or other promotion.

Generally, the system must have some information about each sku in order to identify the skus in an image. For example, if the system is implemented using machine learning, the machine learning model must be trained with known sample images of each sku in order to be able to recognize that sku in an image of a stack of items on a pallet. One of the challenges is being able to quickly incorporate new skus into the system quickly so that the new skus will be recognized by the system as they appear on pallets.

Disclosed herein is a system and method for identifying new skus that have not yet been trained or otherwise added to the imaging system in the typical way.

SUMMARY

A system and method are provided for imaging and a stack of a plurality of items and identifying those items when the plurality of items that include at least some items on which the machine learning model has not been trained.

A computing system for evaluating a stack of a plurality of items includes at least one processor and at least one non-transitory computer-readable medium storing at least one machine learning model and instructions that, when executed by the at least one processor, cause the computing system to perform the following operations. The computing system receives at least one image of the stack of the plurality of items. The computing system analyzes the at least one image using at least one machine learning model. The computing system compares the plurality of items to the list of expected items. The foregoing steps are repeated for each of a plurality of stacks of the plurality of items. The computing system then uses the at least one machine learning model to form a plurality of groups of images of the plurality of items in the stacks. The computing system then assigns one of the expected items to each of the plurality of groups of images based upon the expected lists of items.

The computing system may then use the plurality of groups of images and the assigned expected items to train the at least one machine learning model.

The computing system may use the elimination based upon the images of the plurality of stacks.

The images of the plurality of items in stacks may be images of a plurality of items on stacks on a plurality of pallets. The plurality of items may be a plurality of packages. The plurality of packages may contain beverage containers and the at least one machine learning model may be trained on images of a plurality of known packages containing beverage containers.

Based upon the analysis of the at least one image of the stack of the plurality of items, the computing system may recognize a recognized subset of the plurality of items. Based upon the analysis of the at least one image of the stack of the plurality of items, the computing system may determine that the at least one machine learning model has not been trained on an unrecognized subset of the plurality of items. The computing system may compare the recognized subset of the plurality of items to a list of expected items. The computing system may compare the unrecognized subset of the plurality of items to the list of expected items. The foregoing steps are repeated for each of a plurality of stacks of the plurality of items. The computing system then uses the at least one machine learning model to form a plurality of groups of images of the plurality of items in the unrecognized subsets of the plurality of items in each of the stacks. The computing system then assigns one of the expected items to each of the plurality of groups of images based upon the expected lists of items.

The computing system may compare the unrecognized subset of the plurality of items to the list of expected items that did not match the recognized subset of the plurality of items.

A method is disclosed for identifying a plurality of items in a stack using a computing system including at least one machine learning model. The method includes receiving at least one image of the plurality of items in the stack. The at least one image is analyzed using the at least one machine learning model. The plurality of items is compared to the list of expected items. The foregoing steps are repeated for each of a plurality of stacks of the plurality of items. Then, using the at least one machine learning model, a plurality of groups are formed of images of the plurality of items in the stacks. Based upon the expected lists of items, one of the expected items is assigned to each of the plurality of groups of images.

The plurality of groups of images and the assigned expected items may then be used to train the at least one machine learning model.

The unrecognized subset of the plurality of items may be compared to the list of expected items that did not match the recognized subset of the plurality of items. Elimination may be used based upon the images of the plurality of stacks.

The stack of the plurality of items may be imaged with a camera, such as a camera mounted adjacent a turntable.

The images of the plurality of items in stacks may be images of the plurality of items stacked on a plurality of pallets.

The plurality of items may be a plurality of packages. The plurality of packages may contain beverage containers. The at least one machine learning model may be trained on images of a plurality of known packages containing beverage containers.

The at least one machine learning model may be trained with a plurality of images of known items, such as packages of beverage containers labeled with known skus.

In the disclosed method, based upon the analysis of the at least one image using the at least one machine learning model, it may be determined that the at least one machine learning model has not been trained on an unrecognized subset of the plurality of items and a recognized subset of the plurality of items may be recognized. The recognized subset of the plurality of items is compared to the list of expected items. The unrecognized subset of the plurality of items is compared to the list of expected items. These steps are repeated for each of a plurality of stacks of the plurality of items. Then, using the at least one machine learning model, a plurality of groups are formed of images of the plurality of items in the unrecognized subsets of the plurality of items in each of the stacks. Based upon the expected lists of items, one of the expected items is assigned to each of the plurality of groups of images

DETAILED DESCRIPTION

Figure 1:
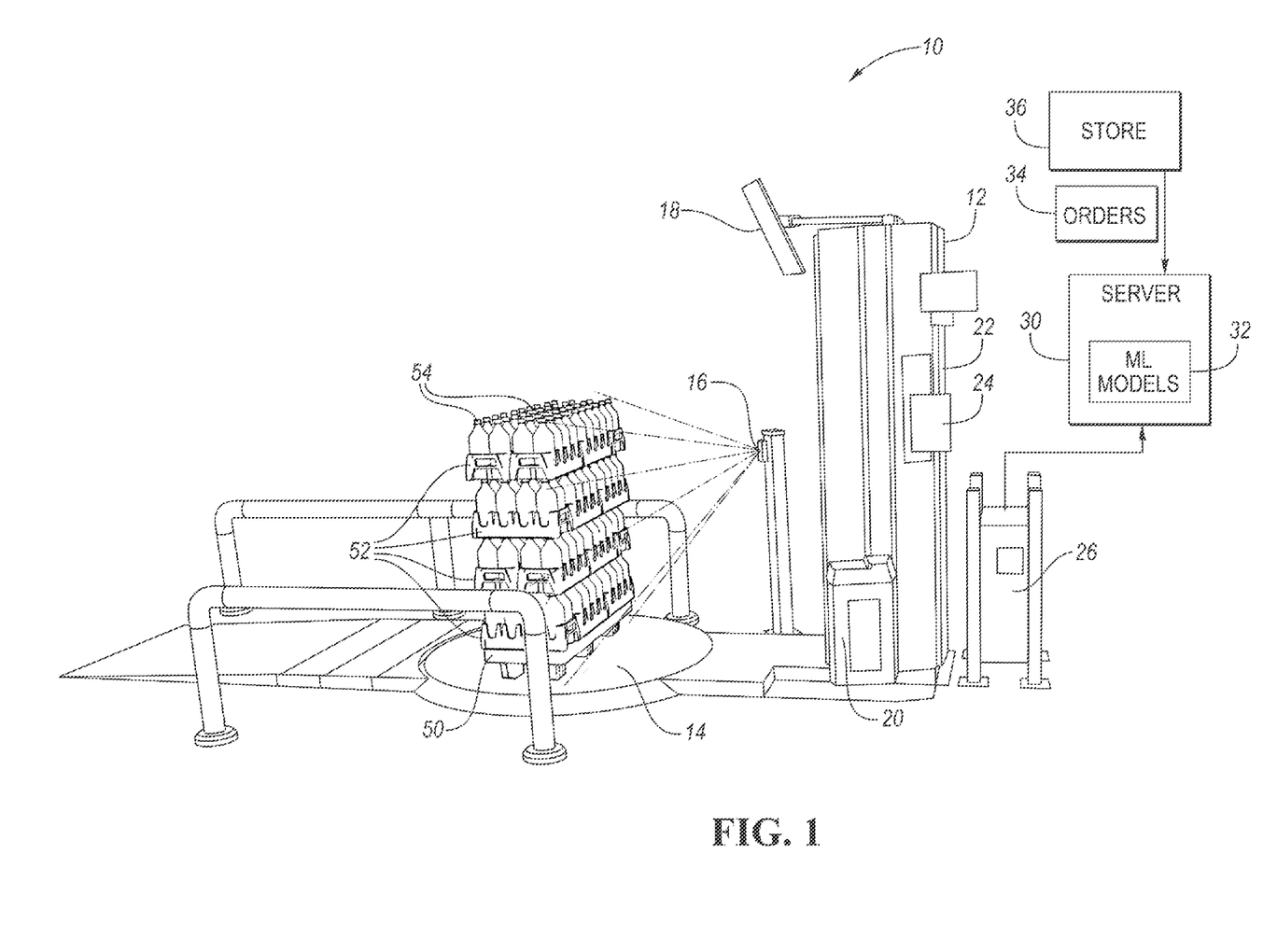
FIG. 1 shows one example of an imaging system.

FIG. 1 shows one embodiment of an imaging system, which in this example is implemented as a pallet wrapper and imaging system 10. The system 10 includes a pallet wrapper 12 having a turntable 14 and at least one camera 16 directed toward the area above the turntable 14. A weight sensor (not visible) may be under the turntable 14 for measuring weight on the turntable 14. Alternatively, the imaging system 10 could be implemented independently of the wrapper.

Lights 18 may direct illumination toward the area above the turntable 14 to assist the camera 16. The computer 26 is programmed to control the turntable 14 and the camera 16 so that the turntable 14 rotates and the camera 16 takes one or more images of the loaded pallet 50. A roll of stretch film 20 is mounted to a tower 22 adjacent the turntable 14. As is known, the roll of stretch film 20 is mounted to be moved vertically on the tower 22, such as by a motor (not shown), while the turntable 14 rotates.

A user interface 24, such as a touchscreen, is mounted on or near the tower 22. A computer 26 includes at least one processor and storage which stores instructions which when executed by the processor perform the functions described herein. A server 30 includes a plurality of machine learning models 32 trained on images of the known skus in the warehouses, which in this example is packages of beverage containers.

In use, the server 30 receives a plurality of orders 34 from stores 36 and presents a pick list of skus to the worker, indicating which items to place on each pallet 50. The worker places the items (e.g. the plastic bottle crates 52 with the plastic bottles 54) on the pallet 50 according to the pick list.

The pallet 50, which could be a half-pallet or a full-size pallet, is loaded with items such as packages of beverage containers, which may include secondary packaging such as bottle crates 52 containing primary packaging, such as bottles 54. The loaded pallet 50 is placed on the turntable 14 for validation and wrapping Preferably, the computer 26 controls the camera 16, lights 18 and turntable 14 so that the camera 16 takes an image of each of the four sides of the loaded pallet 50. The assignee of the present application has developed a validation system that uses machine learning to identify skus of the items on the pallet 50. This is disclosed more fully in US20220129836, filed Oct. 22, 2021, assigned to the assignee of the present application and which is hereby incorporated by reference in its entirety.

Briefly, as described in previous patents, the computer 26 receives images from the camera 16, weight data from the weight sensor, and communicates with the user interface 24. The computer 26 sends all collected data to the server 30, which could be a cloud computer that also receives the same data from other such systems 10 in the same warehouse and such systems 10 in other warehouses in other geographic locations around the world.

The computer 26 (or server 30) identifies the skus of the items on the pallet 50 based upon the images of the stacked items on the pallet 50. In one implementation, each image of the loaded pallet 50 is separated into images of each item on the pallet 50. The packaging type of each item on the pallet 50 (which in this example is a known/expected combination of both the secondary packaging and the primary packaging) is first identified using one machine learning model 32 to analyze the images of the items on the loaded pallet 50. The package types may include, just as illustrative examples, plastic beverage crate with eight 2-liter plastic bottles (shown in FIG. 1), plastic beverage crate with twenty-four 20 oz plastic bottles, corrugated cardboard box, cardboard tray with twenty-four 20 oz plastic bottles and plastic overwrap, cardboard box holding thirty-six 12 oz aluminum cans, and others. The "brand" (i.e. the specific content, such as the flavor and type of the beverage) is then identified using another machine learning model 32 (which has been selected from among a plurality of brand machine learning models 32 based upon the identified package type) to analyze the images of the items on the pallet 50. The computer 26 then compares the identified skus to the expected skus on the order/pick list and generates alerts (such as on user interface 24) for any mismatches.

This application provides an improved system and method for learning new skus. Supervised learning requires labeled data. That is, each image of a sku must be labeled by hand as that sku in order to train the machine learning models 32. Active learning speeds up this process by labeling the majority of the trained skus automatically. It however cannot reliably label untrained skus, or skus where the packaging has changed significantly. The present application discloses a system and a method implementing unsupervised learning that can automatically label new skus, sku changes, new packaging, and new package types.

Unsupervised learning for a simpler problem is a well-studied computer vision problem. It can take many forms depending on the problem, but one is called unsupervised image clustering. In an example problem, there are 500 unlabeled images of cats and 500 unlabeled images of dogs. To train a cat vs dog model, one would have to label those 1000 images by hand. However, if those 1000 images were fed into an unsupervised image clustering method, it would split those images into two unlabeled groups such that all the cats are in one group and all the dogs are in the other group. Now all you have to label is the two groups. By looking at which group has pictures of cats in it, one can determine that that group must be the cat group. Then by labeling that group as cats, all images in the group are labeled as cats as well. The number of labels created by hand went from 1000 to 2.

However, the above case only works because everyone knows what cats and dogs look like. For the sku validation system, hardly anyone knows what "01200002463" looks like, which would be the output of the inference engine using the machine learning models 32 based upon an image of one of the items on the pallet 50 (such as a bottle crate 52 loaded with bottles 54). However, an elimination method utilizes the picklists from many pallets 50 plus the groups of skus that come from the clustering method in order to automatically label each group.

The elimination method uses images of multiple loaded pallets 50 to identify skus rather than just using a single pallet 50. While one could sometimes use the process of elimination using a single pallet 50, it would be hard to trust the method due to bad data such as bad picklist data, bad detections, stitching errors, bad lighting, etc. Running the method on more pallets 50 increases confidence in its decisions.

The picklists 34 and unlabeled groups are the input to the elimination method. The output of the method is the labeled groups.

After the method finishes, the labeled groups are used to label each individual sku, and then the final labeled images are automatically sent to the Training Set and new models are created and deployed. This process continuously runs in the cloud.

Figure 2:
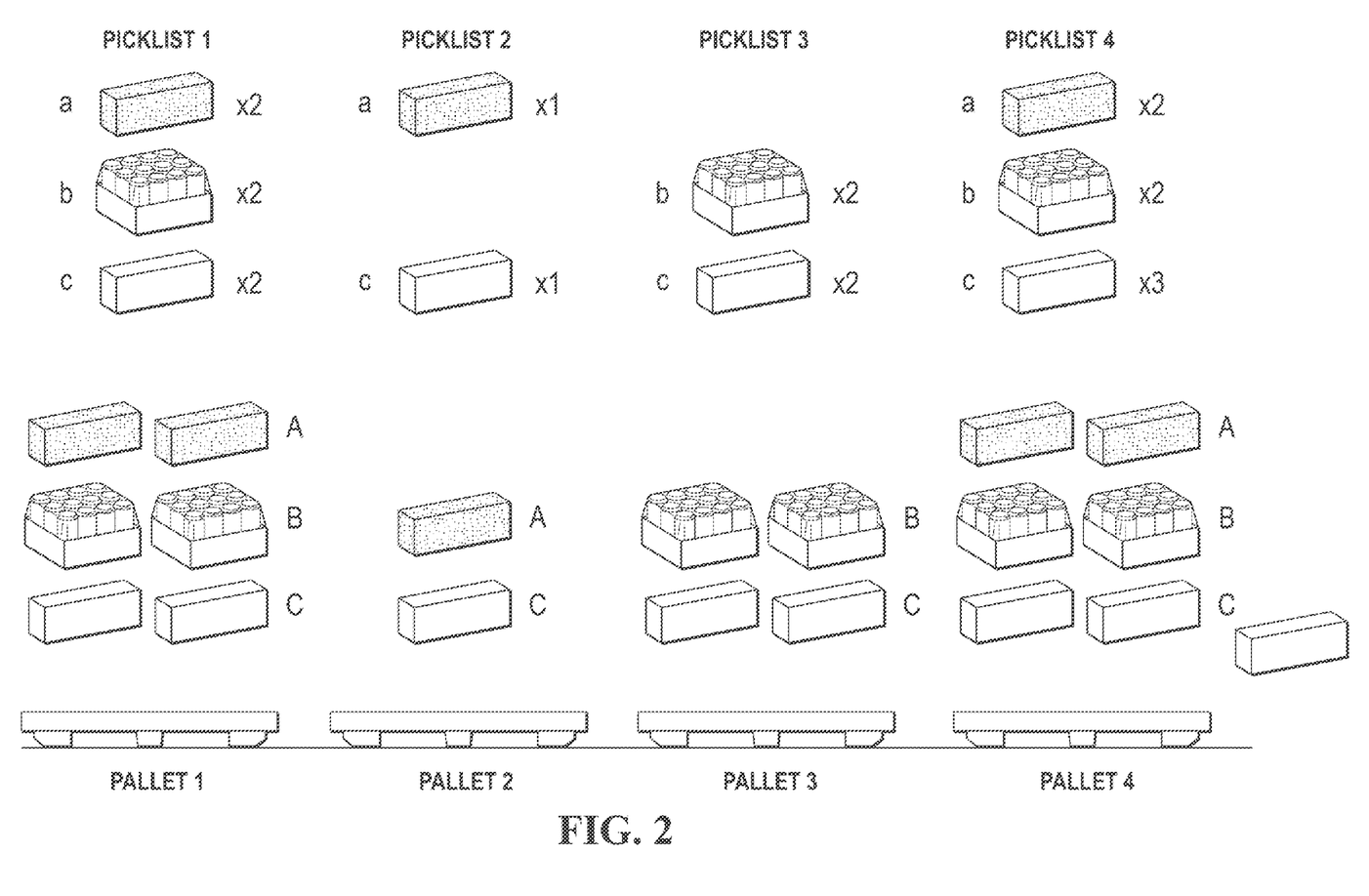
FIG. 2 demonstrates the unsupervised learning method used in the imaging system of FIG. 1.
Figure 3:
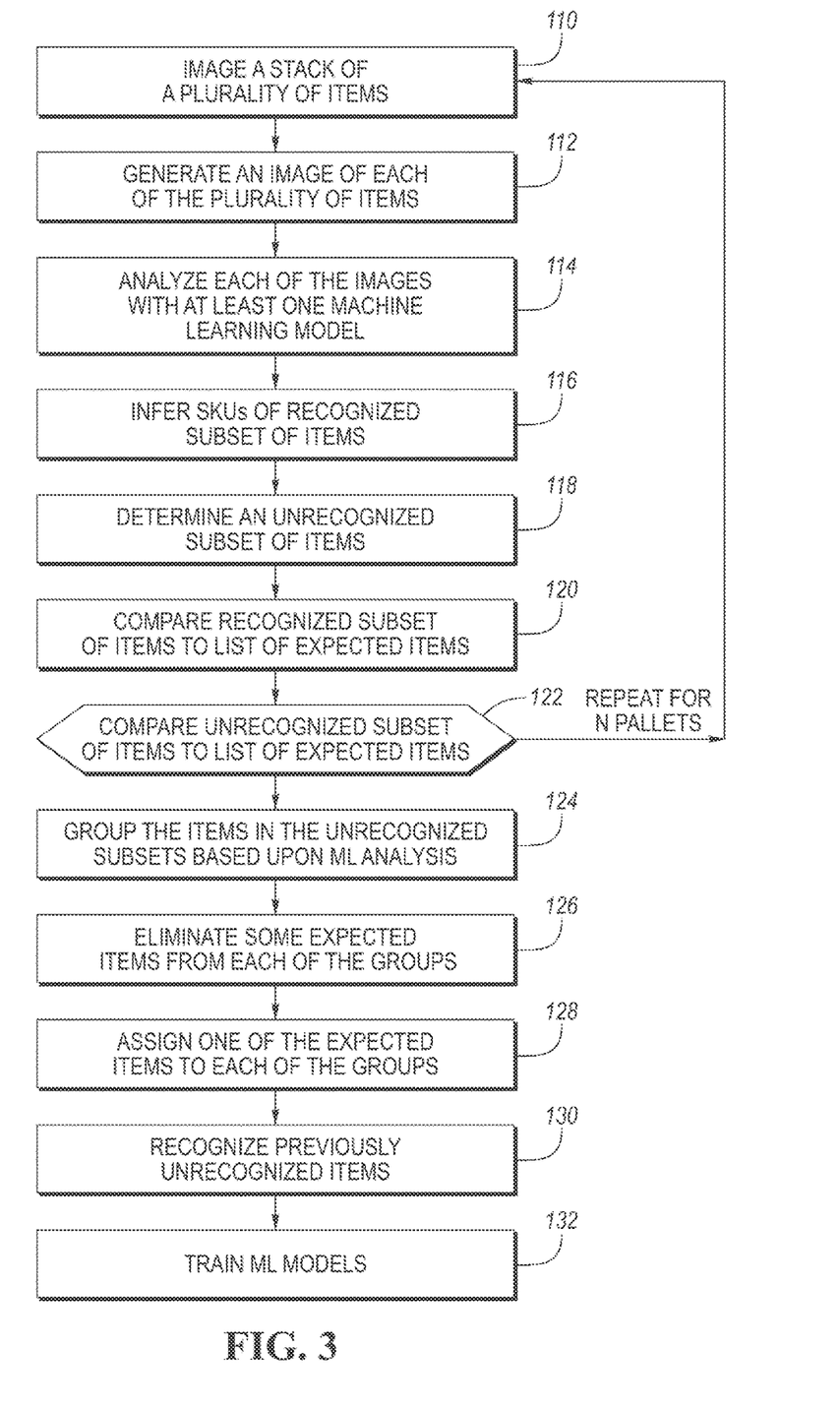
FIG. 3 is a flowchart of an example unsupervised learning method used in the imaging system of FIG. 1.

An example will be shown with reference to FIG. 2 and the flowchart of FIG. 3, using three unknown skus in different combinations on three pallets with their associated picklists. On pallet 1, there are two each of unknown products A, B, and C, and the associated picklist 1 indicates skus a, b, and c. On pallet 2, there are only one of each of unknown products A and C, and the associated picklist 2 indicates skus a, and c. On pallet 3, there are two each of unknown products B and C, and the associated picklist 3 indicates skus b and c. For the most part, the various steps of the method of FIG. 3 could be performed on the computer 26 and/or the server 30 (either of which or some combination thereof being a "computing system").

As explained above, the stack of items on the pallet 1 is imaged in step 110. An image of each of the plurality of items is generated in step 112 (i.e. the images of each of the items are separated from the images of the entire stack of items). Each of the images of each of the items is analyzed in step 114 using at least one machine learning model 32 (FIG. 1). The skus of a recognized subset of items in the stack of items on the pallet 1 may be inferred with a sufficiently high confidence level in step 116 (the recognized items are not shown in FIG. 2 for simplicity).

In step 118, the machine learning model will not recognize product images A, B, and C as skus a, b, and c because the model has not been trained on those skus. In other words, the highest confidence level at which skus are inferred by the inference engine based upon the machine learning models 32 will be below a minimum threshold (e.g. 60%). It is also contemplated that this method could be used even if the machine learning model has been trained on none of the skus.

In step 120, the recognized subset of items will be compared to the list of expected items, i.e. the pick list. As before, matches will confirm that the items have been properly picked for that order. Mismatches will require correction. Optionally, any pallets with any indicated errors among the recognized subset of items may be ignored in steps 124 to 132.

In step 122, the unrecognized subset of items (in this example, two each of products A, B, and C) is compared to the list of expected items (again, the pick list)—in particular, the items that were not already matched to the recognized subset of items, in this example, two each of skus a, b, and c. Optionally, if a one-to-one correspondence is lacking, i.e. if there were not two each of three unrecognized products and two each of three expected skus not matched to the recognized items, then the data from this pallet may be ignored in steps 124 to 132.

Steps 110 to 122 are repeated for pallets 2 and 3. In practice, many more loaded pallets would be used in this method. For example, hundreds or thousands of loaded pallets with the unrecognized products may be imaged over the course of a day (or week or month) before the method proceeds to step 124.

In step 124, the server 30 recognizes that unknown product A on pallets 1 and 2 are the same sku, unknown product B on pallets 1 and 3 are the same sku, and unknown product C on pallets 1, 2, and 3 are the same sku. This is the grouping method. The server 30 may group these products using the machine learning models 32. Again, the server 30 did not infer any known sku at a high confidence level using the machine learning models 32; however, the inference engine of the server 30 still generates an output for each product. If those outputs are similar enough to one another, then they are grouped (i.e. they are the same sku, albeit unknown sku).

In step 126, the server 30 performs the elimination method in conjunction with the picklists. In this manner, the system can learn which images are associated with which skus. In this simplified example, the system knows that skus a, b, and c are supposed to be on pallet 1, skus a and c are supposed to be on pallet 2, and skus b and c are supposed to be on pallet 3.

According to the picklists, sku b is supposed to be on pallet 1, but not on pallet 2. Therefore, the system can determine through elimination that the image of the product B on pallet 1 must correspond to sku b (step 128). The system already knows that product B on pallet 1 is the same as product B on pallet 3, so now it knows that product B on pallet 3 is also sku b (step 128). By elimination, product C on pallet 3 must be sku c. Via the grouping, product C on pallets 1 and 2 must also be sku c. By eliminating products B and C and skus b and c in step 126, the system determines that product A on pallets 1 and 2 is sku a in step 128.

After the elimination method finishes, the labeled images of the products (i.e. associating the images of the products A, B, C, with skus a, b, c respectively) are automatically sent to the training set and new machine learning models are created and deployed in step 132 (such as at the end of the day, or weekly, or monthly). This process continuously runs in the cloud (on server 30).

Additionally, elimination may be done by identifying a unique quantity of the sku in the case that two pallets have the same skus, but in different quantities. For example, if we want to identify product C on pallet 1, and all we have are pallets 1 and 4, then we can do so by grouping the images and then combining the picklists. The resulting picklist would be four of a, 4 of b, and five of c. The image/sku groups would also show there is a group of four images, a group of four images, and a group of five images. We can then assume that the group of five images must be the group of five skus from the picklist, which is sku c.

Additionally, a voting system may be used to increase confidence by identifying disagreements about which sku an image actually is. In the above example, pallets 1 and 4 were combined to identify sku c on pallet 1. This result can be double checked by combining pallet 1 and pallet X instead of pallet 1 and pallet 4, where X is any pallet that would also result in a unique quantity for sku c. This is repeated for a plurality of combinations of pallets, for such combinations that yield unique quantities for one of the skus. The more combinations used for each sku, the more votes a sku receives and the higher the confidence we have in the predicted label.

In practice, there will be many more than three or four pallets and there will be some errors, e.g. sometimes new unknown product B will be loaded on a pallet when the picklist called for new sku c. But with larger numbers of samples, the errors can be identified and eliminated in the elimination method. The system will recognize that elimination methods would yield a sku for a few of the images that is different from the other images in the same group. Those results are eliminated and not used further in the elimination method or in future training of the machine learning model.

With this system and method, new skus can be introduced into the warehouse or distribution center more easily.

It should also be noted that the techniques disclosed above, it is not necessary that there are any previously-known skus. The techniques could be used to train the machine learning model(s) without any previously-labeled images of the actual products in the warehouse. All of the packages in the warehouse could be unknown. The machine learning model(s) may be preliminarily trained with some images of similar products (e.g. similar packages of beverage containers) that are hand-labeled. If there are enough permutations of the packages on pallets, then eventually the machine learning model(s) would be fully trained on all of the skus.

As new skus are added, the techniques described above will label images of the new products as the new skus. The machine learning model(s) will be retrained periodically using the images labeled using the techniques described above, including any previously-labeled images. In other words, the machine learning model(s) could be trained with the images that were labeled in one time period using the methods described above, and then the machine learning model(s) could be retrained with those previously-labeled images and with new labeled images of old skus and new skus that were received and labeled in a subsequent time period. Over time the machine learning model(s) will improve for all of the skus, even as they change.

Although the present invention is described in the context of training machine learning models to identify packages, in particular packages of beverage containers, the present invention could be used in other systems to learn new skus of other items or other objects or anything (images, sounds, patterns, etc) that can be recognized by machine learning, computer vision, or other systems.

Additionally, it is also contemplated that the unsupervised learning method disclosed herein could be used in conjunction with and complementary to some supervised learning, active learning, and/or manual labeling of data.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

Alphanumeric identifiers on method steps are solely for ease in reference in dependent claims and such identifiers by themselves do not signify a required sequence of performance, unless otherwise explicitly specified.

What is claimed is:

1. A method for identifying a plurality of items in a plurality of stacks using a computing system including at least one machine learning model, the method including:
   a) receiving at least one image of the plurality of items in one of the plurality of stacks;
   b) analyzing the at least one image using the at least one machine learning model;
   c) comparing the plurality of items to a list of expected items expected to be in the one of the plurality of stacks;
   d) repeating steps a) to c) for each of the plurality of stacks of the plurality of items;
   e) using the at least one machine learning model, forming a plurality of groups of images of the plurality of items in the plurality of stacks; and
   f) based upon the lists of expected items, assigning one of the expected items to each of the plurality of groups of images.

2. The method of claim 1 further including:
   g) using the plurality of groups of images and the assigned expected items to train the at least one machine learning model.

3. The method of claim 1 further including a step of imaging a plurality of items in the one of the plurality of stacks prior to step a).

4. The method of claim 1 wherein step f) includes using elimination based upon the images of the plurality of items in the stacks.

5. The method of claim 1 wherein the plurality of items in the plurality of stacks are stacked on a plurality of pallets.

6. The method of claim 5 wherein the plurality of items are a plurality of packages.

7. The method of claim 6 wherein the plurality of packages contain beverage containers and wherein the at least one machine learning model is trained on images of a plurality of known packages containing beverage containers.

8. A computing system for evaluating a plurality of items in a plurality of stacks comprising:
   at least one processor; and
   at least one non-transitory computer-readable medium storing:
      at least one machine learning model; and
      instructions that, when executed by the at least one processor, cause the computing system to perform operations comprising:
   a) receiving at least one image of one of the plurality of stacks of the plurality of items;
   b) analyzing the at least one image using the at least one machine learning model;
   c) comparing the plurality of items to a list of expected items expected to be in the one of the plurality of stacks;
   d) repeating steps a) to c) for each of the plurality of stacks of the plurality of items;
   e) using the at least one machine learning model, forming a plurality of groups of images of the plurality of items in of the stacks; and
   f) based upon the lists of expected items, assigning one of the expected items to each of the plurality of groups of images.

9. The system of claim 8 wherein the operations further include:

g) using the plurality of groups of images and the assigned expected items to train the at least one machine learning model.

10. The system of claim 8 wherein operation f) includes using elimination based upon the images of the plurality of items in the plurality of stacks.

11. The system of claim 8 wherein the plurality of items in the plurality of stacks are stacked on a plurality of pallets.

12. The system of claim 11 wherein the plurality of items are a plurality of packages.

13. The system of claim 12 wherein the plurality of packages contain beverage containers and wherein the at least one machine learning model is trained on images of a plurality of known packages containing beverage containers.

14. The system of claim 13 further including at least one camera for taking the at least one image of the stack of the plurality of items.

15. The method of claim 1 wherein the at least one image includes an image of each of four sides of the plurality of items in the stack.

16. The system of claim 8 wherein the at least one image includes an image of each of four sides of the plurality of items in the stack.

17. The method of claim 1 wherein the list of expected items in step c) is an order for the items expected to be in the one of the plurality of stacks.

18. The method of claim 1 wherein the list of expected items in step c) is a list of items to be shipped to a store.

19. The method of claim 1 further including the step of: prior to step a) presenting the list of expected items to instruct a user to place the plurality of items in the one of the plurality of stacks.

20. The system of claim 8 wherein the list of expected items in operation c) is an order for the items expected to be in the one of the plurality of stacks.

21. The system of claim 8 wherein the list of expected items in operation c) is a list of items to be shipped to a store.

22. The system of claim 8 further including the operation of: prior to step a) presenting the list of expected items to instruct a user to place the plurality of items in the one of the plurality of stacks.

23. A computing system for evaluating a plurality of packages in a plurality of stacks comprising:
   at least one processor; and
   at least one non-transitory computer-readable medium storing:
      at least one machine learning model trained on images of a plurality of known packages; and
      instructions that, when executed by the at least one processor, cause the computing system to perform operations comprising:
   a) receiving at least one image of each of a subset of the plurality of packages in one of the plurality of stacks;
   b) analyzing the at least one image using the at least one machine learning model to generate an output for each of the subset of the plurality of packages in the one of the plurality of stacks;
   c) comparing the outputs from operation b) for the subset of the plurality of packages in the one of the plurality of stacks to a list of a plurality of expected SKUs that are expected to be in the one of the plurality of stacks, wherein the list of the plurality of expected SKUs in operation c) is a list of SKUs to be shipped to a store;
   d) repeating steps a) to c) for each of the plurality of stacks of the plurality of packages;
   e) based upon the at least one machine learning model, forming a plurality of groups of images of the plurality of packages in the plurality of stacks; and
   f) based upon the lists of the expected SKUs, assigning one of the plurality of expected SKUs to each of the plurality of groups of images.

24. The system of claim 23 further including the operation of: prior to step a) presenting the list of the plurality of expected SKUs to instruct a user to place the subset of the plurality of packages in the one of the plurality of stacks.

* * * * *